US009891963B2

(12) United States Patent
Parker et al.

(10) Patent No.: US 9,891,963 B2
(45) Date of Patent: Feb. 13, 2018

(54) SYSTEM AND METHOD FOR OPTIMIZING USER NOTIFICATIONS FOR SMALL COMPUTER DEVICES

(71) Applicant: Microsoft Technology Licensing, LLC, Redmond, WA (US)

(72) Inventors: Kathryn L. Parker, Fall City, WA (US); Peter Vale, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/483,947

(22) Filed: Sep. 11, 2014

(65) Prior Publication Data

US 2014/0380339 A1 Dec. 25, 2014

Related U.S. Application Data

(63) Continuation of application No. 13/733,695, filed on Jan. 3, 2013, now Pat. No. 8,839,273, which is a
(Continued)

(51) Int. Cl.
*G06F 9/54* (2006.01)
*G06F 15/02* (2006.01)
(Continued)

(52) U.S. Cl.
CPC ............ *G06F 9/542* (2013.01); *G06F 15/02* (2013.01); *H04L 67/303* (2013.01); *H04L 69/24* (2013.01);
(Continued)

(58) Field of Classification Search
None
See application file for complete search history.

(56) References Cited

U.S. PATENT DOCUMENTS 5,225,826 A * 7/1993 DeLuca ............... G08B 5/227
340/7.41
5,561,703 A * 10/1996 Arledge ............... H04M 3/533
340/7.29
(Continued)

FOREIGN PATENT DOCUMENTS

EP 1029289 8/2000
EP 1217532 6/2002
(Continued)

OTHER PUBLICATIONS

Custer, Helen *Inside Windows NT*, 1993, pp. 74-81.
(Continued)

*Primary Examiner* — Tuan Dao

(57) ABSTRACT

A system and method for notifying users in a manner that is appropriate for the event and the environment for the user. The method of the present invention relates to determining the desired properties of an event and assigning varying notification characteristics to that event. Profiles are created of the various events, wherein each profile relates to a different mode or situational environment, such as a meeting environment, an office or normal environment, a louder outside-type environment, etc. The invention further relates to placing the small computer device in a particular mode, either automatically or manually. Once in a particular mode the device provides notifications according to that mode.

20 Claims, 6 Drawing Sheets

Related U.S. Application Data continuation of application No. 12/265,557, filed on Nov. 5, 2008, now Pat. No. 8,352,961, which is a continuation of application No. 09/741,571, filed on Dec. 19, 2000, now Pat. No. 7,458,080.

(51) Int. Cl.
 *H04M 1/725* (2006.01)
 *H04L 29/08* (2006.01)
 *H04L 29/06* (2006.01)
(52) U.S. Cl.
 CPC ...... *H04L 69/329* (2013.01); *H04M 1/72563* (2013.01); *H04M 1/72566* (2013.01); *H04M 1/72569* (2013.01); *H04M 1/72572* (2013.01)

(56) References Cited

U.S. PATENT DOCUMENTS

| | | | |
|---|---|---|---|
| 5,760,773 A | 6/1998 | Berman et al. | |
| 5,808,907 A | 9/1998 | Shetty et al. | |
| 5,831,611 A * | 11/1998 | Kennedy | G06F 3/04817 715/763 |
| 6,125,385 A | 9/2000 | Wies et al. | |
| 6,177,950 B1 | 1/2001 | Robb | |
| 6,208,996 B1 | 3/2001 | Ben-Shachar et al. | |
| 6,209,009 B1 | 3/2001 | Schwartz et al. | |
| 6,219,051 B1 | 4/2001 | Furuya | |
| 6,317,718 B1 | 11/2001 | Fano | |
| 6,317,727 B1 | 11/2001 | May | |
| 6,374,101 B1 | 4/2002 | Gelbien | |
| 6,418,309 B1 | 7/2002 | Moon et al. | |
| 6,427,064 B1 | 7/2002 | Henderson | |
| 6,476,825 B1 | 11/2002 | Croy et al. | |
| 6,489,950 B1 | 12/2002 | Griffin et al. | |
| 6,526,335 B1 | 2/2003 | Treyz et al. | |
| 6,546,231 B1 | 4/2003 | Someya et al. | |
| 6,587,835 B1 | 7/2003 | Treyz et al. | |
| 6,782,253 B1 | 8/2004 | Shteyn et al. | |
| 6,816,878 B1 | 11/2004 | Zimmers et al. | |
| 6,850,901 B1 | 2/2005 | Hunter et al. | |
| 6,968,179 B1 | 11/2005 | De Vries | |
| 6,999,992 B1 | 2/2006 | Deen et al. | |
| 7,209,955 B1 | 4/2007 | Major et al. | |
| 7,458,080 B2 | 11/2008 | Parket et al. | |
| 8,352,961 B2 | 1/2013 | Parket et al. | |
| 8,839,273 B2 | 9/2014 | Parker et al. | |
| 2002/0028674 A1* | 3/2002 | Slettengren et al. | 455/422 |
| 2002/0177453 A1 | 11/2002 | Chen et al. | |
| 2006/0085514 A1 | 4/2006 | Deen et al. | |

FOREIGN PATENT DOCUMENTS

| | | |
|---|---|---|
| WO | 99/21101 | 4/1999 |
| WO | 99/23579 | 5/1999 |

OTHER PUBLICATIONS

European Application 01130078.7, Communication dated Jul. 6, 2007 (5 pages).
European Application 01130078.7, Communication dated Nov. 11, 2009 (3 pages).
European Application 01130078.7, Communication dated Dec. 15, 2008 (4 pages).
European Application 01130078.7, Notice of Appeal dated Jun. 18, 2012 (4 pages).
European Application 01130078.7, Search Report dated Jan. 8, 2004 (3 pages).
European Application 01130078.7, Summons to Attend Oral Proceedings Feb. 29, 2012 (13 pages).
Horvitz, E.; Jacobs, A.; Hovel, D., *Attention-Sensitive Alerting*, Proceedings of UAI '99, Conference on Uncertainty and Artificial Intelligence, Jul. 1999, Morgan Kaufman Publishers: San Francisco, pp. 305-313.
*Nokia 9110 Communicator User's Manual*, [online] < 1998 > XP002133409, Originally retrieved from the Internet on Mar. 17, 2000, URL: < http://www.nokia.com/phones/9110/userguide.html >., parts 1 and 2, pp. 1-177.
Perry, Greg *Teach Yourself Windows 95 in 24 Hours*, 2$^{nd}$ Ed., 1997, pp. 1-578.
U.S. Appl. No. 09/741,571, Advisory Action dated Jan. 23, 2004 (3 pages).
U.S. Appl. No. 09/741,571, Advisory Action dated Jan. 31, 2006 (3 pages).
U.S. Appl. No. 09/741,571, Advisory Action dated Oct. 31, 2007 (3 pages).
U.S. Appl. No. 09/741,571, Advisory Action dated Dec. 3, 2004 (3 pages).
U.S. Appl. No. 09/741,571, Amendment After Final filed Jan. 3, 2006 (3 pages).
U.S. Appl. No. 09/741,571, Amendment After Final filed Oct. 15, 2007 (10 pages).
U.S. Appl. No. 09/741,571, Amendment After Notice of Allowance dated Oct. 24, 2008 (2 pages).
U.S. Appl. No. 09/741,571, Amendment and Response filed Apr. 24, 2008 (14 pages).
U.S. Appl. No. 09/741,571, Amendment and Response filed Apr. 26, 2007 (22 pages).
U.S. Appl. No. 09/741,571, Amendment and Response filed Jun. 14, 2004 (10 pages).
U.S. Appl. No. 09/741,571, Amendment and Response filed Jul. 22, 2005 (15 pages).
U.S. Appl. No. 09/741,571, Amendment and Response filed Oct. 13, 2006 (13 pages).
U.S. Appl. No. 09/741,571, Amendment and Response filed Nov. 1, 2004 (10 pages).
U.S. Appl. No. 09/741,571, Amendment and Response filed Dec. 20, 2005 (21 pages).
U.S. Appl. No. 09/741,571, Amendment and Response dated Jan. 5, 2004 (8 pages).
U.S. Appl. No. 09/741,571, Amendment and Response dated Oct. 8, 2003 (7 pages).
U.S. Appl. No. 09/741,571, Final Rejection dated Jul. 13, 2007 (15 pages).
U.S. Appl. No. 09/741,571, Final Rejection dated Aug. 31, 2004 (11 pages).
U.S. Appl. No. 09/741,571, Final Rejection dated Oct. 20, 2005 (17 pages).
U.S. Appl. No. 09/741,571, Final Rejection dated Nov. 12, 2003 (7 pages).
U.S. Appl. No. 09/741,571, Non-Final Rejection dated Jan. 8, 2007 (27 pages).
U.S. Appl. No. 09/741,571, Non-Final Rejection dated Jan. 24, 2008 (13 pages).
U.S. Appl. No. 09/741,571, Non-Final Rejection dated Mar. 16, 2004 (9 pages).
U.S. Appl. No. 09/741,571, Non-Final Rejection dated Mar. 25, 2005 (16 pages).
U.S. Appl. No. 09/741,571, Non-Final Rejection dated May 17, 2006 (19 pages).
U.S. Appl. No. 09/741,571, Non-Final Rejection dated Jul. 22, 2003 (8 pages).
U.S. Appl. No. 09/741,571, Notice of Allowance dated Jul. 24, 2008 (7 pages).
U.S. Appl. No. 09/741,571, Supplemental Amendment and Response filed Nov. 12, 2007 (14 pages).
U.S. Appl. No. 12/265,557, Amendment After Notice of Allowance filed Jan. 12, 2012 (2 pages).
U.S. Appl. No. 12/265,557, Amendment After Notice of Allowance filed Dec. 16, 2011 (2 pages).
U.S. Appl. No. 12/265,557, Amendment and Response filed Aug. 20, 2012 (3 pages).
U.S. Appl. No. 12/265,557, Amendment and Response filed Sep. 22, 2011 (9 pages).
U.S. Appl. No. 12/265,557, Non-Final Rejection dated Jun. 22, 2011 (5 pages).

(56) References Cited

OTHER PUBLICATIONS

U.S. Appl. No. 12/265,557, Notice of Allowance dated May 18, 2012 (13 pages).
U.S. Appl. No. 12/265,557, Notice of Allowance dated Aug. 30, 2012 (14 pages).
U.S. Appl. No. 12/265,557, Notice of Allowance dated Dec. 1, 2011 (10 pages).
U.S. Appl. No. 13/733,695, Amendment and Response filed Apr. 21, 2014, 6 pages.
U.S. Appl. No. 13/733,695, Amendment and Response filed Jul. 30, 2013, 9 pages.
U.S. Appl. No. 13/733,695, Amendment and Response filed Dec. 10, 2013, 10 pages.
U.S. Appl. No. 13/733,695, Final Office Action dated Oct. 11, 2013, 16 pages.
U.S. Appl. No. 13/733,695, Non-Final Office Action dated Jun. 5, 2013, 16 pages.
U.S. Appl. No. 13/733,695, Notice of Allowance dated Jan. 21, 2014, 8 pages.
U.S. Appl. No. 13/733,695, Notice of Allowance dated May 12, 2014, 8 pages.

* cited by examiner

SYSTEM AND METHOD FOR OPTIMIZING USER NOTIFICATIONS FOR SMALL COMPUTER DEVICES

CROSS-REFERENCE TO RELATED APPLICATIONS

This application is a continuation of U.S. patent application Ser. No. 13/733,695, filed Jan. 3, 2013 and entitled, "SYSTEM AND METHOD FOR OPTIMIZING USER NOTIFICATIONS FOR SMALL COMPUTER DEVICES", which is a continuation of U.S. Pat. No. 8,352,961, filed Nov. 5, 2008, and entitled "SYSTEM AND METHOD FOR OPTIMIZING USER NOTIFICATIONS FOR SMALL COMPUTER DEVICES", which is a continuation of U.S. Pat. No. 7,458,080, filed on Dec. 19, 2000, and entitled "SYSTEM AND METHOD FOR OPTIMIZING USER NOTIFICATIONS FOR SMALL COMPUTER DEVICES", all of which applications are hereby incorporated herein by their reference.

RELATED CASES

This application is a continuation of U.S. patent application Ser. No. 13/733,695, entitled "SYSTEM AND METHOD FOR OPTIMIZING USER NOTIFICATIONS FOR SMALL COMPUTER DEVICES," filed Jan. 3, 2013, now U.S. Pat. No. 8,839,273, which is a continuation of U.S. patent application Ser. No. 12/265,557, entitled "SYSTEM AND METHOD FOR OPTIMIZING USER NOTIFICATIONS FOR SMALL COMPUTER DEVICES," filed Nov. 5, 2008, now U.S. Pat. No. 8,352,961, which is a continuation of U.S. patent application Ser. No. 09/741,571, entitled "SYSTEM AND METHOD FOR OPTIMIZING USER NOTIFICATIONS FOR SMALL COMPUTER DEVICES," filed Dec. 19, 2000, now U.S. Pat. No. 7,458,080, all of which are hereby incorporated by reference.

TECHNICAL FIELD

The present invention relates to small, portable computing devices, and particularly to computing devices that provide user notifications relating to particular events. More particularly still, the present invention relates to algorithms implemented in determining notification characteristics.

BACKGROUND OF THE INVENTION

Small, handheld computing devices have been steadily growing in popularity in recent years. The devices are known by different names, such as palmtops, pocket computers, personal digital assistants, personal organizers, H/PCs, or the like. Additionally, many portable telephone systems, such as cellular phones, incorporate sufficient computing capabilities to fall within the category of the small, handheld computing devices. These devices, hereinafter "small computer devices," provide much of the same functionality as their larger counterparts. In particular, the small computer devices provide users the ability to perform word processing, task management, spreadsheet processing, address book functions and Internet browsing, as well as many other functions. Of particular importance to small computer device users is the ability to be notified of various events, such as appointment reminders, reception of email, and in the case of portable phones, to be notified of incoming telephone calls and text messages, etc.

Typically notifications may be presented to a user in many different ways. For example, the notifications may be any number or types of audible signals, such as telephone rings, sound wave files or other sounds. Additionally, many small computing devices provide other means of notification, such as by displaying a notification on the display area of the computing device, turning on or flashing a light emitting diode (LED) light, or vibrating. Typically, each event is associated with a particular type of notification and different events often trigger or initiate different types of notifications. For example, receiving email may cause one sound while appointment reminders may trigger a different sound.

One particular drawback associated with notifications in small computing devices relates to the appropriateness of the type of notification used as compared with the constantly changing environment for the user. That is, given the small size of the small computer devices, users typically carry them into numerous different situations. A particular type of notification may be appropriate for one situation, yet not for another. For example, an appointment reminder may be associated with a chime-type notification that generates an audible signal at a predetermined time. The chime may be an appropriate type of notification when the user is alone in an office or at home, but may not be appropriate when the user is in a meeting with other people who may also hear the chime.

One solution to this problem relates to having a mute button on the small computer device so that during situations where a chime notification may not be appropriate, the user can effectively turn audible signals off. Such a mute button typically works in combination with the speaker at a hardware level. A mute button, however, is not an optimal solution since a user may still want some notifications to be audible. For example, a user may desire that all notifications be silent while in a meeting except for critical events, such as receiving a high priority e-mail message. As another example, a user may want all appointment reminders to be silent but the same user may want email notifications to be audible when waiting for an important email or telephone call from a particular person. The mute button does not allow for the distinguishing between different notification events to provide different types of notifications to the user since it essentially turns the speaker off.

Additionally, the mute button only relates to audible signals and does not control vibrations or visual-type signals that may be inappropriate in certain circumstances. Therefore, if the user wants to change the appointment reminders from an audible signal to a vibrating signal, the mute button is ineffective. In such a case the user would have to modify each appointment in the calendar, setting the notification type to vibrate. Not only is this task cumbersome, but it must also be performed each time the environment changes.

Another drawback associated with using a mute button to control notification types is that the user must manually press the mute button when entering a quiet environment, i.e., an environment wherein the user does not want to be audibly notified of events. Placing the onus on the user to manually press the mute button increases the probability that the device will not be placed in a non-audible mode because users tend to forget such things until an audible signal interrupts the user. Thus, a mute button is an unsatisfactory solution to handling notifications.

It is with respect to these considerations and others that the present invention has been made.

SUMMARY OF THE INVENTION

The present invention relates to a system and method for notifying users in a manner that is appropriate for the event and the environment for the user. The method of the present invention relates to determining the desired properties of an event and assigning varying notification characteristics to that event. Profiles are created of the various events, wherein each profile relates to a different mode or situational environment, such as a meeting environment, an office or normal environment, a louder outside-type environment, etc. The invention further relates to placing the small computer device in a particular mode, either automatically or manually. Once in a particular mode the device provides notifications according to that mode.

In accordance with certain aspects, the present invention relates to a method of storing at least one profile of notification events in the memory of a small computer device, wherein the notification events are associated with at least one notification type, and notifying a user of an event according to the stored profile. The method may store more than one profile and each profile is associated with a unique notification mode. Additionally, a selection method is provided to select one notification mode and once selected the mode is applied to the small computer device and the device remains in the selected mode until another mode is selected. A calendar-type application program may generate the selection signal. The user is notified of events according to the selected notification mode.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION OF THE INVENTION

An embodiment of the invention provides control of user notifications for different environments through the use of customized notification profiles. Each profile has information related to each type of notification event (such as a meeting reminder, a button press among others) and a corresponding notification type (such as an audible chime, a visual display, among others) for each notification event. Thus, each profile may be configured to provide different types of notifications for a plurality of different types of notification-type events. Using the profiles, the small computer device may be set to a predetermined mode, wherein the mode relates to a predetermined notification profile so that each notification is presented to the user in the appropriate manner. For example, while in a "meeting" mode, the small computer device uses the "meeting" profile to provide notifications to the user in an appropriate manner. Another embodiment of the invention automatically sets the small computer device into customized notification mode in response to events stored in an associated calendar application.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 1:
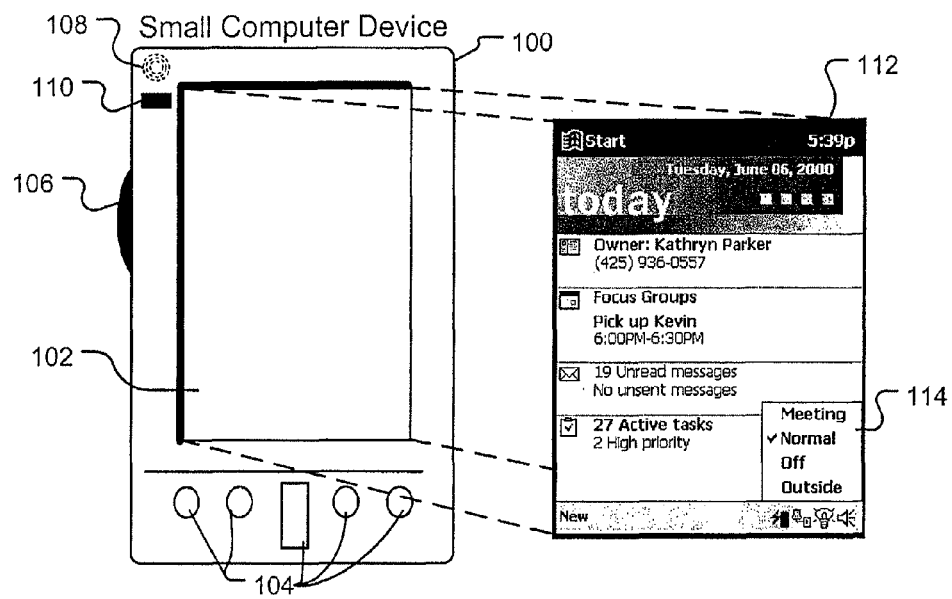
FIG. 1 illustrates a small computer device displaying a graphical user interface screen shot incorporating a sound mode icon related to the present invention.

A computing device 100 incorporating aspects of the present invention is shown in FIG. 1. In an embodiment of the invention, the computer 100 is a handheld computer having both input elements and output elements. Input elements may include touch screen display area 102 and input buttons 104 and allow the user to enter information into the computer 100. The small computing device also incorporates a side input element 106 allowing further user input. The side input 106 element may be a rotary switch, a button, or any other type of manual input element. In alternative embodiments, the small computing device 100 may incorporate more or less input elements. For example, the display 102 may not be a touch screen in some embodiments. In yet another alternative embodiment, the computing device is a portable phone system, such as a cellular phone having a display 102 and input buttons 104 and 106.

The small computing device 100 further incorporates output-type elements, such as display 102 which displays information to the user, including a graphical user interface, such as display 112, text, and/or controls. Other output elements include speaker 108 and LED light 110. Additionally, device 100 may incorporate a vibration module (not shown) which causes the device 100 to vibrate wherein the vibration notifies the user of a predetermined event. Thus, the vibration module may be deemed an output element since vibrations provide the indication of the event or other computer-related occurrence to the user. In yet another embodiment, the computer device may incorporate headphone jack (not shown) for providing another means of providing output signals.

Display 112 is an exemplary display screen that may be shown on display screen 102. Additionally, the exemplary display 112 illustrates a mode menu 114 which indicates to the user the current notification mode for the system and which modes are available to the user. As discussed in more detail below, the user may select a notification mode from menu 114, to switch to other notification modes.

Although described herein in combination with a small computer device 100, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. The invention may also be practiced in distributed computing environments where tasks are performed by remote processing devices that are linked through a communications network in a distributed computing environment, programs may be located in both local and remote memory storage devices. In essence, any computer system having a plurality of output elements to provide notifications to a user and a plurality of notification event types may incorporate the present invention.

Figure 2:
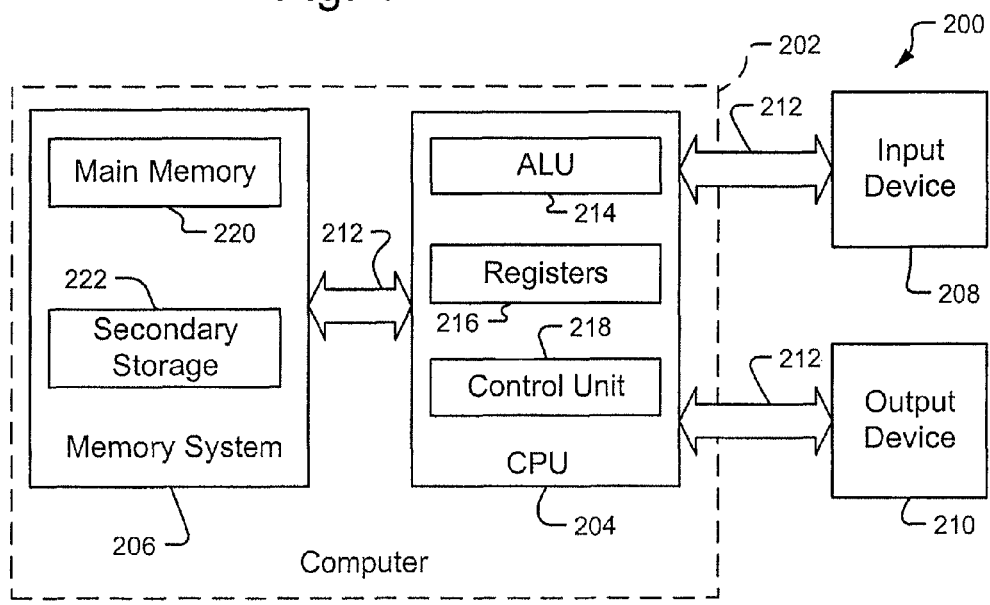
FIG. 2 is block diagram of a computer used in an embodiment of the present invention, such as the computer shown in FIG. 1.

The computer 100 (shown in FIG. 1) incorporates a system 200 of resources for implementing an embodiment of the invention, as shown in FIG. 2. The system 200 incorporates a computer 202 having at least one central processing unit (CPU) 204, a memory system 206, an input device 208, and an output device 210. These elements are coupled by at least one system bus 212.

The CPU 204 is of familiar design and includes an Arithmetic Logic Unit (ALU) 214 for performing computations, a collection of registers 216 for temporary storage of data and instructions, and a control unit 218 for controlling operation of the system 200. The CPU 204 may be a microprocessor having any of a variety of architectures including, but not limited to those architectures currently produced by Intel, Cyrix, AMD, IBM and Motorola.

The system memory 206 comprises a main memory 220, in the form of media such as random access memory (RAM) and read only memory (ROM), and may incorporate or be adapted to connect to secondary storage 222 in the form of long term storage mediums such as hard disks, floppy disks, tape, compact disks (CDs), flash memory, etc. and other devices that store data using electrical, magnetic, optical or other recording media. The main memory 220 may also comprise video display memory for displaying images through the output device 210, such as a display screen. The memory can comprise a variety of alternative components having a variety of storage capacities such as magnetic cassettes memory cards, video digital disks, Bernoulli cartridges, random access memories, read only memories and the like may also be used in the exemplary operating environment. Memory devices within the memory system and their associated computer readable media provide nonvolatile storage of computer readable instructions, data structures, programs and other data for the computer system.

The system bus 212 may be any of several types of bus structures such as a memory bus, a peripheral bus or a local bus using any of a variety of bus architectures.

The input and output devices are also familiar and are briefly discussed above with respect to FIG. 1. Although not shown, and in addition to those described above, the input device can further comprise a microphone, a small keyboard, a mouse, a wireless communication system, a touch pad etc. Similarly, the output device may further comprise output elements such as a printer, a wireless communication system, etc. Some devices, such as a network interface or a modem can be used as input and/or output devices. The input and output devices are connected to the computer 202 through system buses 212.

The computer system 200 further comprises an operating system and usually one or more application programs. The operating system comprises a set of programs that control the operation of the system 200, control the allocation of resources, provide a graphical user interface to the user, facilitate access to local or remote information, and may also include certain utility programs such as a notification module. An application program is software that runs on top of the operating system software and uses computer resources made available through the operating system to perform application specific tasks desired by the user. In general, applications are responsible for generating notifications in accordance with the present invention, but the invention may be integrated into the operating system, as part of a notification control object, for example. Exemplary operating systems in which the notification system may be integrated with include Microsoft Corporation's Windows for Pocket PC operating system for handheld personal computers.

Computing device 100 typically includes at least some form of computer readable media. Computer readable media can be any available media that can be accessed by 100. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 3:
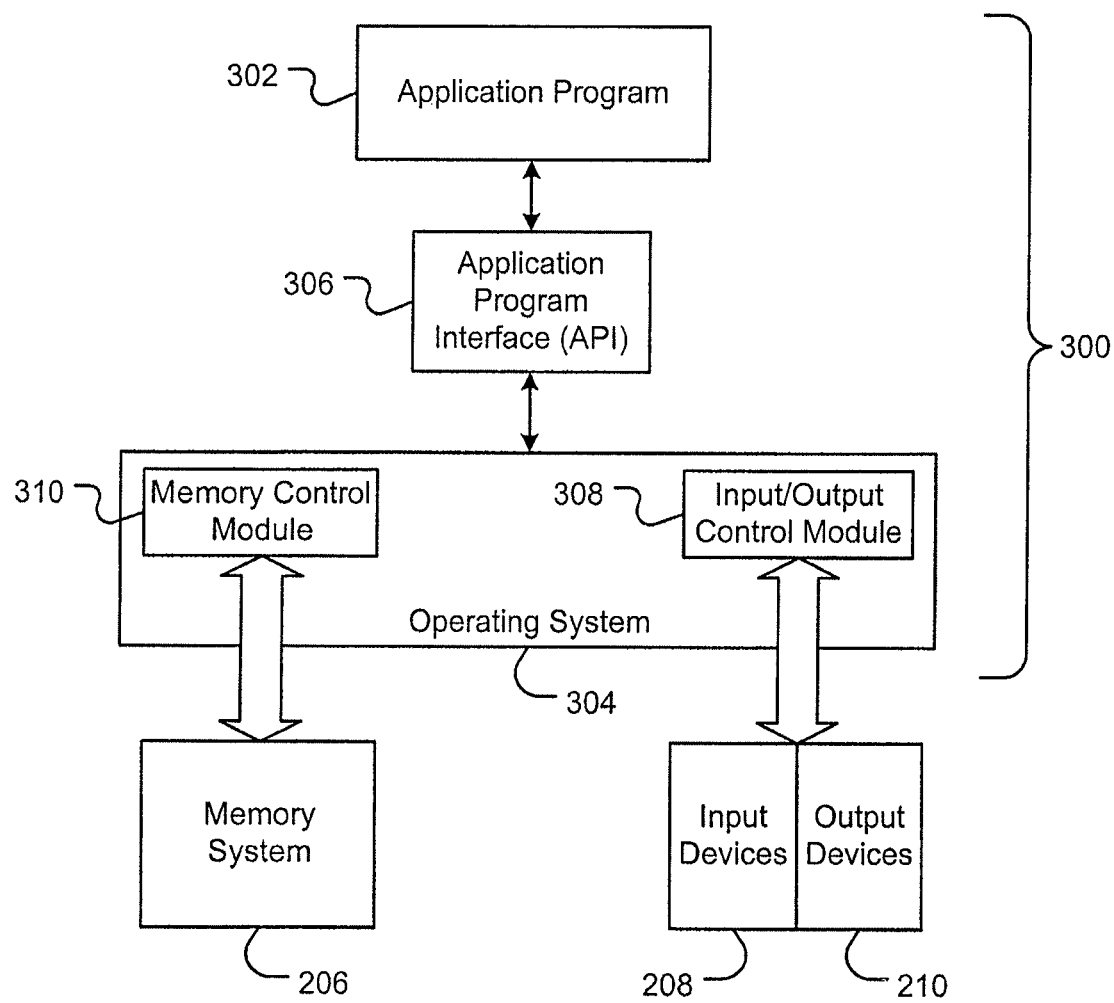
FIG. 3 is a block diagram illustrating a software environment in an embodiment of the present invention.

An exemplary software environment 300 that incorporates aspects of the present invention is shown in FIG. 3. Application program 302 is executed to create or edit a notification profile. The application program 302 communicates with operating system 304 through an application program interface 306. In alternative embodiments, the application program 302 communicates directly with the operating system 304. Although the embodiment shown in FIG. 3 provides application program 302 as the program for customizing notification profiles, in an alternative embodiment, the notification profile customization utility is integrated with operating system 304.

The application program 302 communicates with a user through the operating system, the input/output control module 308 and the input/output devices 208 and 210. The application program 302 receives input signals to customize various notification modes. Each mode has an associated profile and is stored by the application program 302 in the memory system 206 through the operating system 304 through a memory control module 310. Additionally, the application program 302 provides the user the ability to set the notification mode for the device 100. Once the user chooses a particular notification mode, the application program informs the operating system 304 of the notification mode. Later, once a notification event occurs, the operating system 304 uses the chosen notification mode to initiate user notifications.

Notification profiles are stored in the memory system 206 and typically comprise a lookup table of values. In an embodiment of the invention, the memory 206 stores at least three different profiles: a normal profile, an outside profile and a meeting profile. The normal profile has intermediate volume levels for notifications and does not employ vibration type notification since vibrations tend to consume significant amounts of power. The outside profile has louder volume levels since it can be harder to hear a notification outside. Further, the outside profile employs vibration to further aid the user in recognizing notifications. The meeting profile has volume levels set to silent so that others are not interrupted. Additionally, the meeting profile may also employ vibrations as a notification type that informs the user of an event but does not interfere with the meeting. Table 1, shown below, highlights some of these and other features associated with these exemplary notification profiles.

TABLE 1

| Profile | Volume | Sound Files | Enabled Notification Type |
|---|---|---|---|
| Normal | Intermediate | Default Sound Files | Sound, LED and Messages |
| Outside | Loud | Default Sound Files | Sound and Vibration |
| Meeting | Disabled | No Sounds Used | LED, Messages and Vibration |

As may be appreciated, many other profiles may be created and stored. For example the system may incorporate an "off" profile which effectively turns all notifications off. Additionally, although not shown, profiles may be created that provide for certain notification types, such as sound, for only specific notification events, such as critical reminders. As an example, the profile may be set to silent mode for all notification events except for a phone call or email from a particular person.

Figure 4:
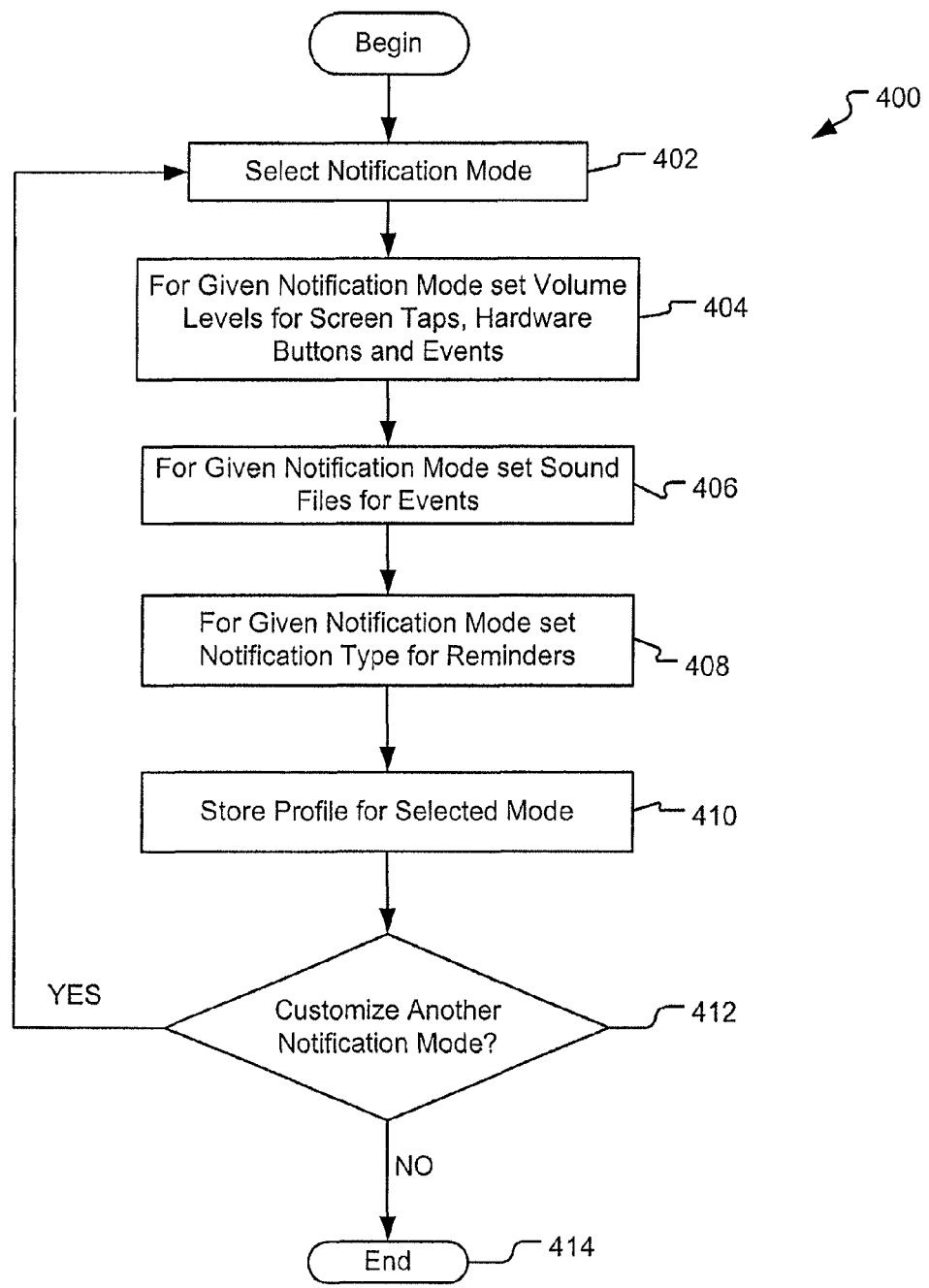
FIG. 4 is a flow diagram illustrating operational flow characteristics of customizing a notification profile in accordance with the present invention.

FIG. 4 is a flow chart of the operational characteristics related to customizing a notification mode, i.e., creating a notification profile in accordance with the present invention. The customization process 400 may be performed for each notification mode. Different methods may be employed in order to initiate flow 400. That is, the flow 400 may be started by the user through the selection of customization item in a predetermined menu or a customization icon. In other embodiments, other initiation events are contemplated, such as pressing a predetermined button or combination of buttons.

To begin, the select mode operation 402 selects a mode that is to be modified, wherein the mode may be named, such as "meeting," "normal," etc. In one embodiment, the selection of a particular mode may be performed using a drop-down menu by a user. Other embodiments provide for the selection of modes in other manners, such as by typing the mode name, for example.

Once a particular mode is selected, volume selection operation 404 selects the volume levels for a plurality of different notification events. For example, the volume levels for screen taps and control button presses may be set by volume selection operation 404 as well as the volume levels for system events, e.g., "critical stop" and others. Typically, the user selects these volume levels based on an understanding of the environments that the particular profile will be used. Following volume selection operation 404, set sound operation 406 sets the sound files for the various system events. Setting the sound files typically involves selecting a system event and assigning a sound file, such as a ".wav" file to the system event. Again, the user typically sets these sound files based on an understanding of the environment for the profile and an understanding of which sound files are recognizable for different notification events.

Next, set reminder operation 408 sets the type or types of notifications to be performed by the small computer device in reminding the user of an event. Set reminder operation sets notification types, such as vibration, sound, flashing light, or displaying a message to the user to remind the user of an event. In an embodiment, any one or all may be selected to inform the user of an event, depending on the profile. Moreover, for a particular profile, the user may decide to select no notification types for reminders.

Following set operation 408, store operation 410 stores a profile for the selected mode. Storing the profile involves maintaining a look up table in memory wherein the table lists all events and their associated notification types according to set operations 404, 406 and 408.

Once the notification types for the reminders have been set and the profile has been stored, determination act 412 determines whether another notification mode is to be customized. If not, then flow branches NO and the flow 400 ends at end operation 414. Otherwise, flow branches YES to select operation 402 and flow 400 is repeated. Determination act 412 may occur explicitly by prompting the use to select another mode for customization or by selecting a "complete" or "done" control button to indicate that no more modes are to be customized. Alternatively, determination act 412 may occur implicitly wherein the user either selects another mode for customization or exits the customization process by selecting another, unrelated feature.

As may be appreciated, the acts of customizing the volume levels, sound files and reminder information may be performed in different order. Moreover, in an embodiment, default values for these items are stored in memory. When default values are stored for the separate profiles, a user has the option of customizing all, some or none of the various elements, e.g., volume, sound files, etc.

Figure 5:
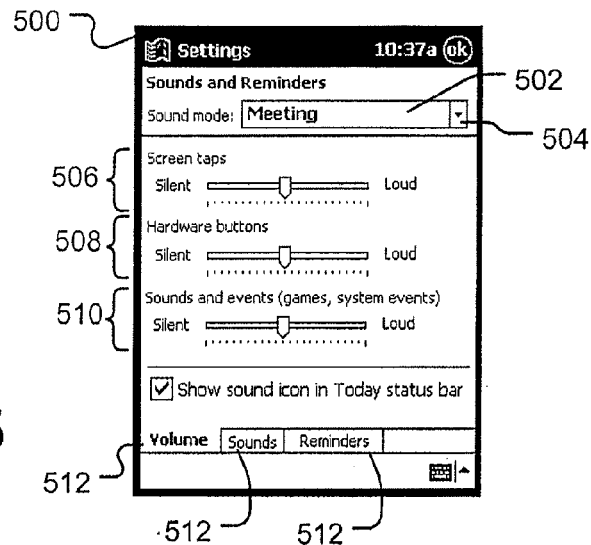
FIGS. 5-7 are exemplary displays incorporating aspects of the present invention for creating a profile.
Figure 6:
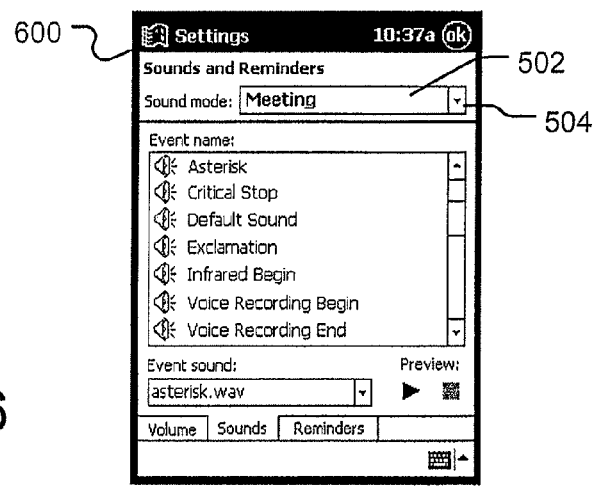
Figure 7:
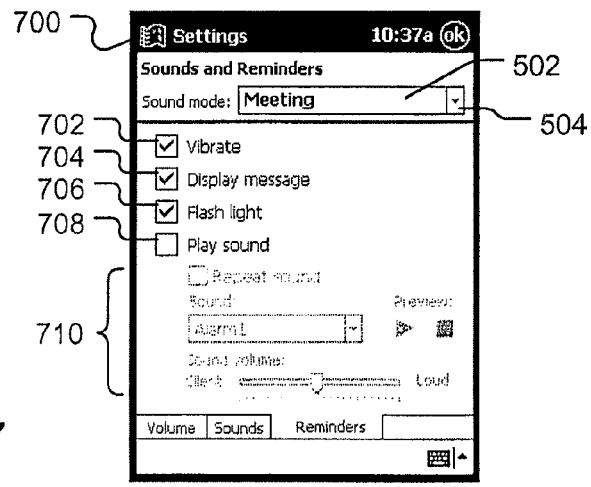

FIGS. 5, 6 and 7 illustrate screen shots for an embodiment of the invention during the flow 400 of customizing a notification mode. FIG. 5 illustrates volume selection operation 404. The particular mode is shown in text box 502. Control 504 allows for the drop-down selection of another mode, if desired. Slide controls 506, 508 and 510 are used to select volume levels for different types of notification events. Slide control 506 is used to select the volume level for screen taps while control 508 is used to select the volume level for hardware button presses. Additionally, slide control 510 is used to select the volume level for system events, such as a critical stop. As may be appreciated, in the illustrated embodiment, no volume control is provided for setting the volume level for reminders in this particular display. Instead the volume control for reminders is provided during the setting of notification types discussed below. Alternative embodiments provide for the setting of the volume for reminders as well as from a display similar to display 500.

FIG. 6 demonstrates the setting of the sound files for the various system events. As in FIG. 5, the present notification mode is illustrated in text box 502. Setting the sound files for various system events relates to assigning a particular file, such as a ".wav" executable file to be executed when the predetermined system event occurs. Display 600 provides the graphical user interface display to assign these files.

FIG. 7 illustrates a graphical user interface display 700 for setting notification types to reminder type notifications. That is, a reminder is a particular type of notification event that is triggered in order to remind the user of something, such as a meeting time or a due date for a project, for example. These reminders are typically associated with a calendar type application program, as discussed in more detail below. Reminder-type notification events may be set, using display 700 to trigger different types of notifications. For example, the reminders may be set to cause vibrations by checking box 702, display a message by checking display box 704, flash a light by checking light box 706 or to play a sound by checking sound box 708. If the sound box 708 is selected controls 710 are enabled, otherwise controls 710 are disabled. Controls 710 provide for the management of the types and volume of the sound that is played once a reminder initiates a notification.

Figure 8:
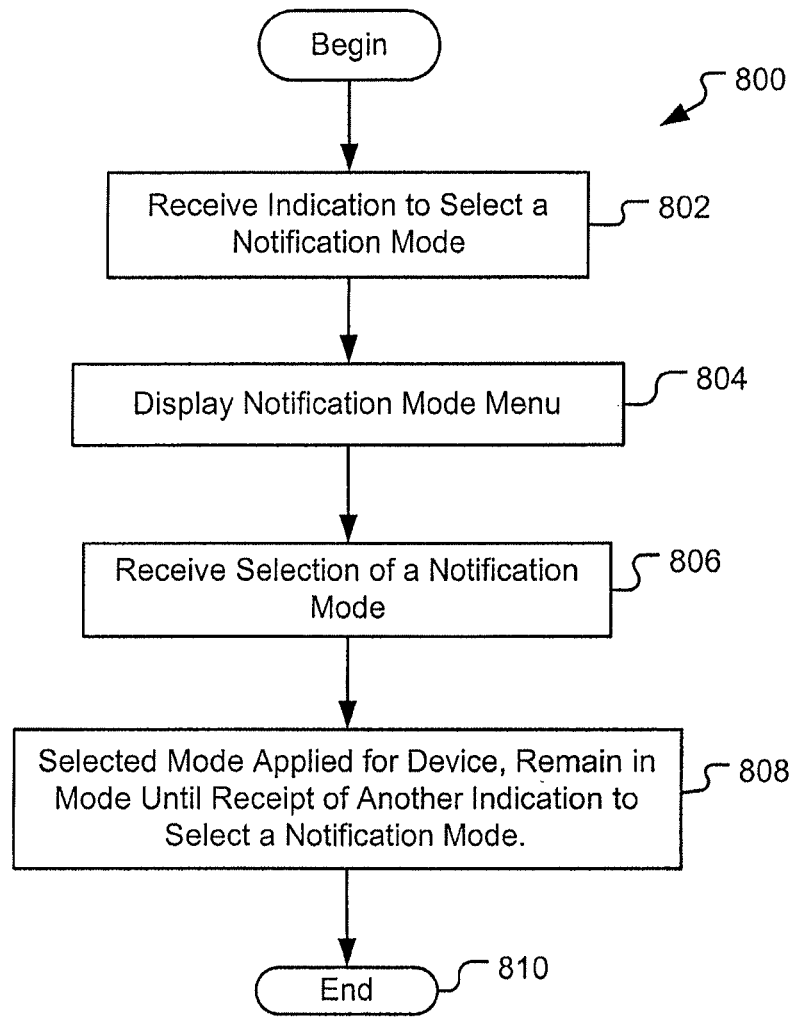
FIG. 8 is a flow diagram showing the operational characteristics of manually assigning and applying a notification mode for the small computer device shown in FIG. 1.

FIG. 8 is a flow chart of the operational characteristics of an embodiment of the present invention related to setting the device into a notification mode. The flow begins when receive operation 802 receives an indication to select a sound mode. That is, in an embodiment, the system is always in a mode, and in order to switch the system from the existing mode to a new one, the system must receive an indication to this effect. For example, the user may select a mode selection icon on the system which indicates to the system that the user desires to change notification modes. Alternatively, the user could select a menu option related to switching the particular mode of the system. In yet other embodiments, the user performs other functions in order to indicate to the system that the modes should be switched.

Once the system receives an indication to switch notification modes, display operation 804 displays a mode menu, such as mode menu 114 shown in FIG. 1. A mode menu displays the available mode options to the user. Moreover, the menu may provide a visual indication to the user relating to the current or existing notification mode, such as a check mark next to the current mode.

Following the display of the mode menu, receive operation 806 receives an indication as to the selected notification mode. That is, the user enters or selects one of the menu options from the mode menu. Selecting one of the menu options causes the system to receive a signal related to the selected menu option. Once receive operation 806 receives a selection, application operation 808 applies the selected mode to the small computer device. While the mode is applied to the device, all notifications presented to the user are done so based on the selected mode. Additionally, the small computer device remains in the selected mode until the system receives another indication to select a different sound mode, such as in operation 802.

Figure 9:
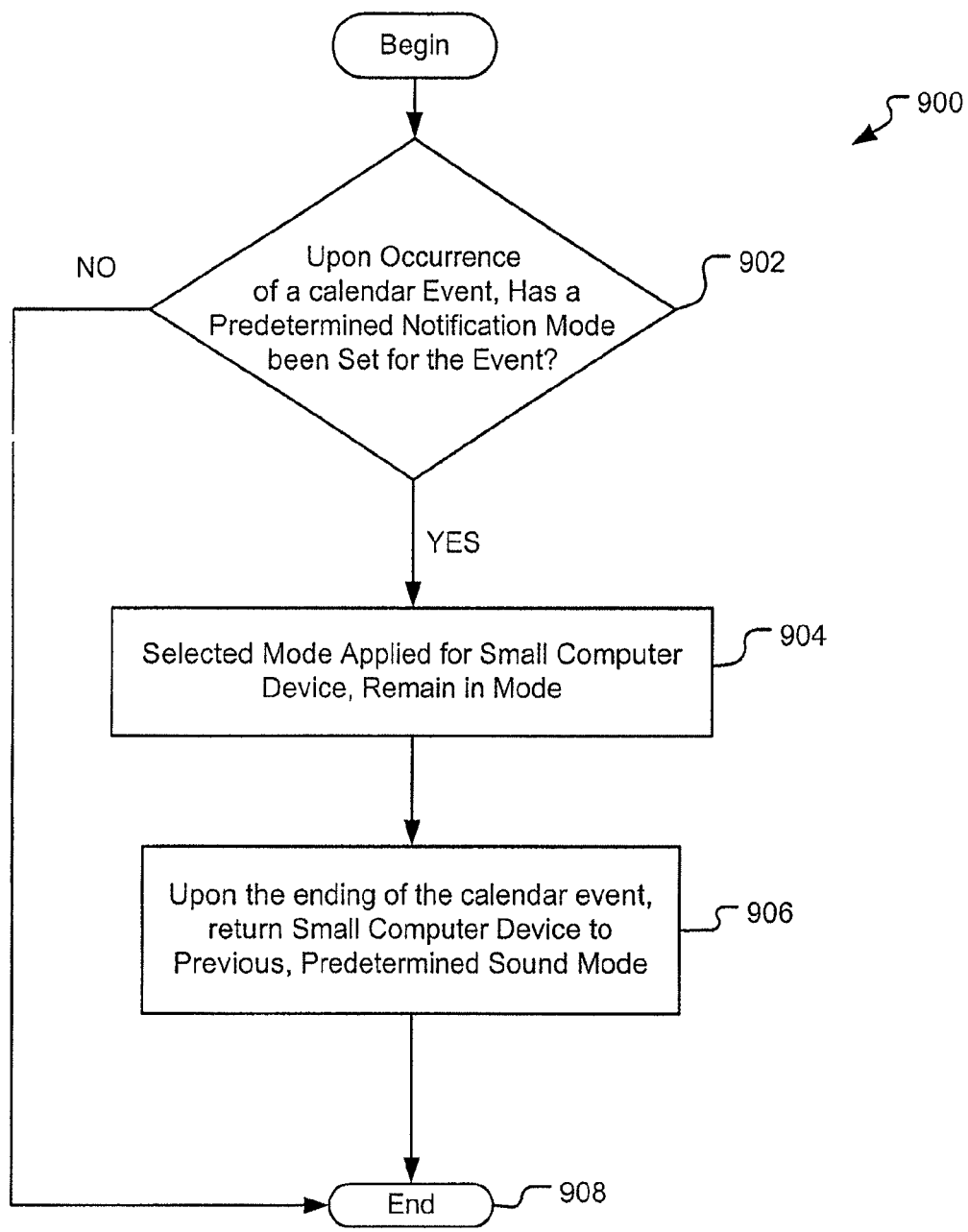
FIG. 9 is a flow diagram showing the operational characteristics of automatically assigning and applying a notification mode for the small computer device shown in FIG. 1.

FIG. 9 is a flow chart of the operational characteristics of an alternative embodiment of the present invention related to automatically setting the device into a notification mode. In an embodiment of the invention, flow 900 only executes when the user has selected "automatic profile switching" as part of the user preferences. Otherwise, the automatic notification flow is not performed and the user must manually enter the device into a particular notification profile. Alternatively, the device 100 may be configured to automatically enter different notification profiles and the user may select to turn off this particular notification preference.

The flow 900 begins when a calendar-related event occurs. Hence, in this embodiment, the small computer device has a calendar-type application capable of storing appointments and other calendar-related items. Moreover, the small computer device has an internal clock system thereby allowing the small computer device to remind the user of upcoming events scheduled in the calendar application.

Upon the occurrence of a calendar-related event, determination operation 902 determines whether a predetermined notification mode has been set for the event. In one embodiment, the user may set a particular notification mode for an event when the event is created and/or edited. Alternatively, the user may associate notification modes with calendar events independently of the creation or editing of the calendar event. If determination operation 902 determines that no predetermined notification mode has been set for the particular calendar event, flown branches NO to end operation 908. In such a case, the notification mode is not changed and any subsequent notifications are presented to the user according to the existing notification mode.

Otherwise, if determination operation 902 determines that a predetermined notification mode has been associated with the calendar event, flow branches YES to application operation 904. Application operation 904 automatically applies the selected mode to the small computer device and any subsequent notifications are presented to the user according to the selected mode. The device remains in the selected mode until the end of the calendar event. Upon the ending of the calendar event, the device is automatically switched back to the previous notification mode. That is, since calendar events typically have both a start time and an end time, the end time is used to switch the notification mode back to its original state.

In an embodiment of the invention, the software could support the automatic profile switching for each appointment individually, wherein the user manually associates an appointment with a particular profile. That profile is then used for all reminders occurring during that one appointment. Alternatively, the user may set a predetermined profile for all appointments of a particular type, e.g., busy, out of office, tentative, free, etc. Therefore, the user does not have to manually set a profile for each appointment individually, but can set a profile based on the type of appointment in a global manner. In such a case, the device automatically enters profile switching mode once an appointment of a predetermined type begins.

Flow 900 may be described by way of an example. Assume a calendar application has stored a one-hour meeting that begins at 1:00 PM and ends at 2:00 PM. Further assume that the meeting event has an associated predetermined notification mode, called "meeting." At 1:00 PM, on the day of the meeting, the calendar application recognizes that a calendar event has started. At this point, the calendar application determines that a predetermined notification mode has been associated with the event, such as at determination operation 902. The calendar application causes, through the operating system, the small device to be switched into meeting mode, such as at operation 904. At 2:00 PM, the calendar application recognizes that the meeting has ended and causes, through the operating system, the small computer device to be switched back into normal mode, or whatever mode the device was in prior to the start of the meeting.

When notification events occur, the application or the operating system must decide if a particular type of event is presented to the user and the type of notification that should be used. That is, in one embodiment, the application determines which mode the device is in and determines, based on the mode, what type of notification to present to the user. In such a case the application provides the operating system with a control signal indicating to execute the notification according to the type of notification stored in the particular profile. In an alternative embodiment, the application merely conducts a control to the operating system to present a notification to the user. In that case, the operating system determines what mode the device is in and presents the notification to the user according to the stored profile.

The above-described invention allows the user to configure sophisticated profiles relating to different modes or expected environments. These profiles maintain a listing of the various type of notification events, e.g., key presses, reminders, wireless communication signals, phone calls, text messages, etc. Additionally, the profiles maintain a list of notification types, e.g., audible, vibration, visual, etc. wherein each notification event is associated with one or more notification types. Thus, prior to providing the user a notification, the device determines the mode that the device is in and presents the notification according to the associated profile. Moreover, the device may be automatically placed in a predetermined mode based on a stored calendar event to relieve the user of the responsibility of remembering when to place the device in a new mode.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention. Since many embodiments of the invention can be made without departing from the spirit and scope of the invention, the invention resides in the claims hereinafter appended.

What is claimed is:

1. A method for providing notification events comprising:
providing a first notification type in a first notification mode for a notification event, wherein the notification event is in a first format comprising a meeting reminder, or a second format comprising a phone call, or a third format comprising an email;
setting a calendar related event at a user device, wherein the calendar related event includes a start time;
detecting the start time of the calendar related event by the user device, wherein the calendar related event is associated with a second notification type in a second notification mode, wherein the second notification type includes one of a different setting for sound, visualization, message display, or vibration than the first notification type in the first notification mode;
providing the second notification type to the user device, wherein the second notification type is provided for notification events in the first format, second format, and third format regardless of a physical location of the user device;
detecting the end of the calendar related event; and
automatically switching to the first notification mode.

2. The method of claim 1, wherein a sound setting comprises at least one of a screen tap setting, a hardware button setting, and an events setting.

3. The method of claim 1, wherein the first notification mode is associated with Normal profile.

4. The method of claim 1, wherein the second notification mode is associated with an Outside profile.

5. The method of claim 4, wherein the second notification type includes at least one of louder sound volume, enabled vibration, disabled visualization, and disabled message display.

6. The method of claim 1, wherein the second notification mode is associated with a meeting profile.

7. The method of claim 6, wherein the second notification type includes at least one of silenced sound volume, enabled vibration, enabled visualization and enabled message display.

8. A computer system comprising:
a processor; and
a memory communicatively coupled to the processor, the memory having computer-executable instructions that when executed by the processor, provide a method for providing notification events comprising:
providing a first notification type in a first notification mode for a notification event, wherein the notification event is in a first format comprising a meeting reminder, or a second format comprising a phone call, or a third format comprising an email;
setting a calendar related event at a user device, wherein the calendar related event includes a start time;
detecting the start time of the calendar related event by the user device, wherein the calendar related event is associated with a second notification type in a second notification mode, wherein the second notification type includes one of a different setting for sound, visualization, message display, or vibration than the first notification type in the first notification mode;
providing the second notification type to the user device, wherein the second notification type is provided for notification events in the first format, second format, and third format regardless of a physical location of the user device;
detecting the end of the calendar related event; and
automatically switching to the first notification mode.

9. The system of claim 8, wherein a sound setting comprises at least one of a screen tap setting, a hardware button setting, and an events setting.

10. The system of claim 8, wherein the first notification mode is associated with Normal profile.

11. The system of claim 8, wherein the second notification mode is associated with an Outside profile.

12. The system of claim 11, wherein the second notification type includes at least one of louder sound volume, enabled vibration, disabled visualization, and disabled message display.

13. The system of claim 8, wherein the second notification mode is associated with a meeting profile.

14. The system of claim 13, wherein the second notification type includes at least one of silenced sound volume, enabled vibration, enabled visualization and enabled message display.

15. One or more computer storage device having computer-executable components that upon execution perform a method for providing notifications-events, the method comprising:
providing a first notification type in a first notification mode for a notification event, wherein the notification event is in a first format comprising a meeting reminder, or a second format comprising a phone call, or a third format comprising an email;
setting a calendar related event at a user device, wherein the calendar related event includes a start time;
detecting the start time of the calendar related event by the user device, wherein the calendar related event is associated with a second notification type in a second notification mode, wherein the second notification type includes one of a different setting for sound, visualization, message display, or vibration than the first notification type in the first notification mode;

providing the second notification type to the user device, wherein the second notification type is provided for notification events in the first format, second format, and third format regardless of a physical location of the user device;

detecting the end of the calendar related event; and automatically switching to the first notification mode.

16. The computer storage device of claim 15, wherein a sound setting comprises at least one of a screen tap setting, a hardware button setting, and an events setting.

17. The computer readable device of claim 15, wherein the first notification mode is associated with Normal profile.

18. The computer readable device of claim 15, wherein the second notification mode is associated with an Outside profile.

19. The computer readable device of claim 18, wherein the second notification type includes at least one of louder sound volume, enabled vibration, disabled visualization, and disabled message display.

20. The computer readable device of claim 15, wherein the second notification mode is associated with a meeting profile.

\* \* \* \* \*